Nov. 10, 1964 — C. A. HUBERT — 3,156,505
TRACK IDLER ADJUSTER
Filed May 22, 1962 — 3 Sheets-Sheet 1

Inventor
Clarence A. Hubert
Paul O. Pippel
Attorney

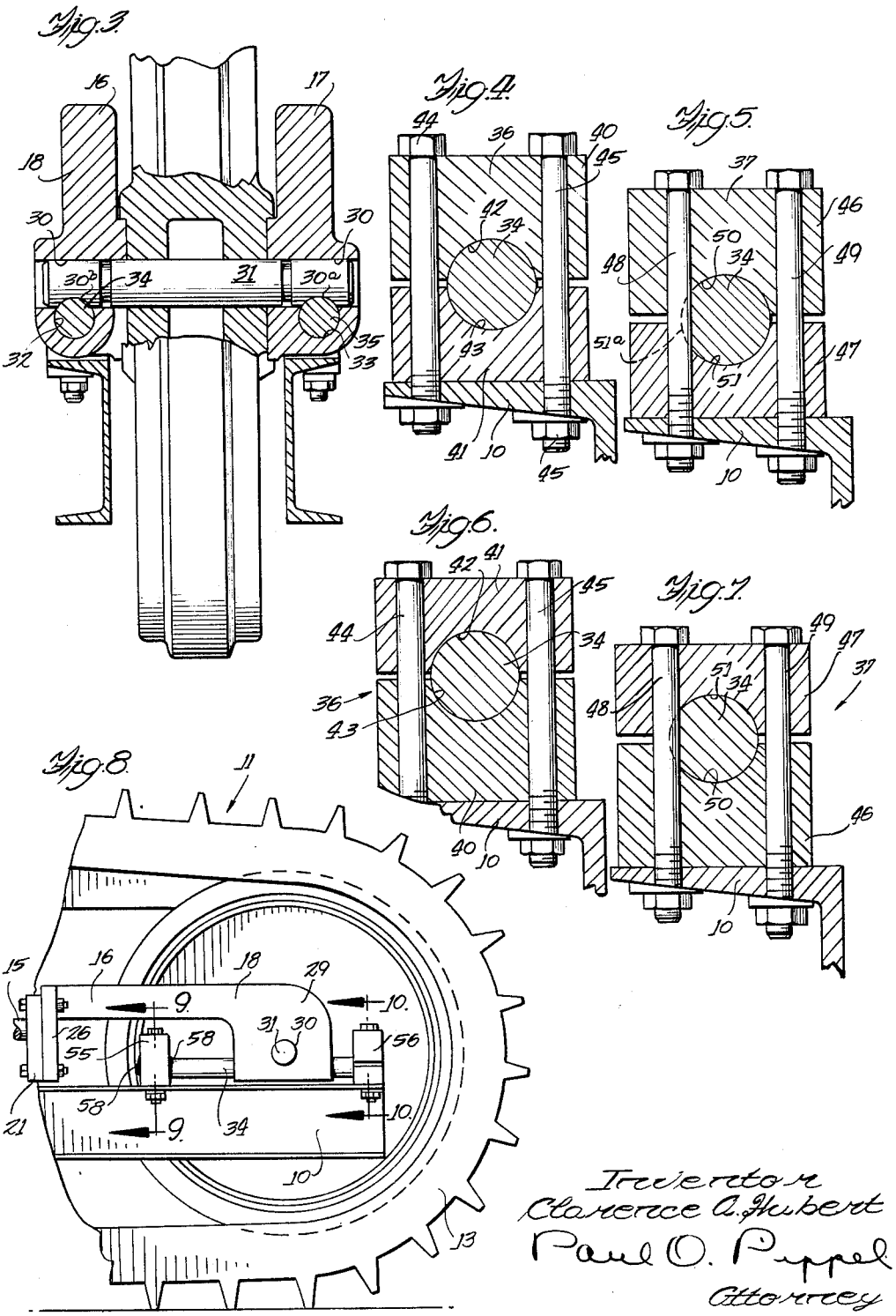

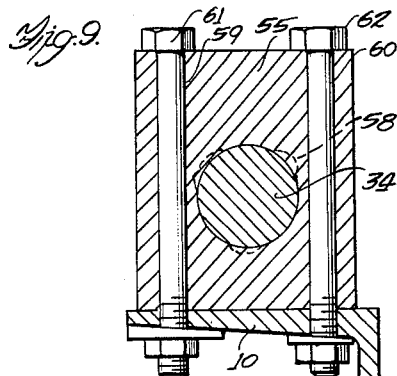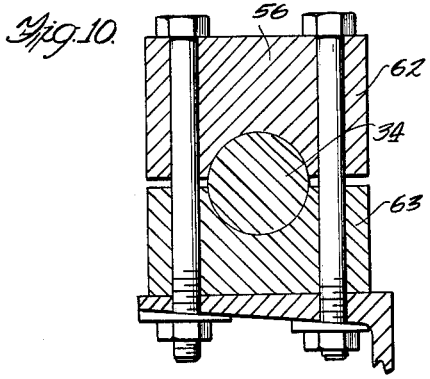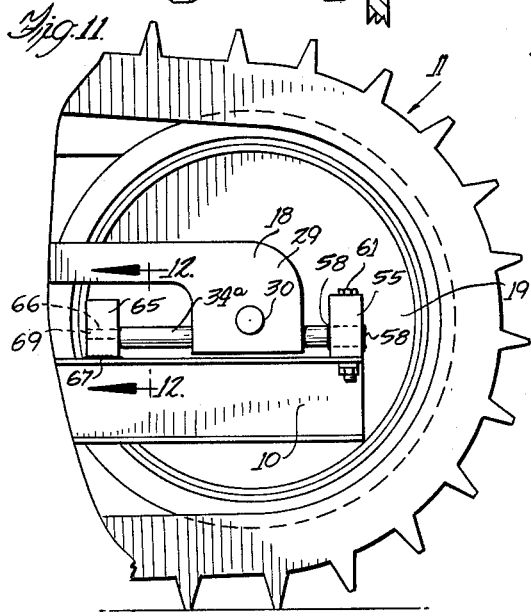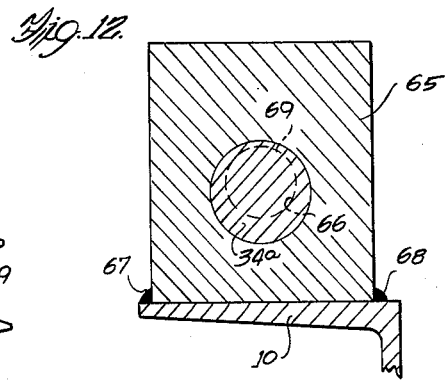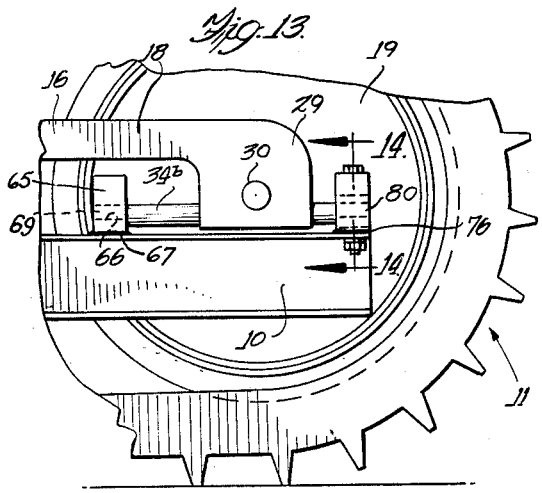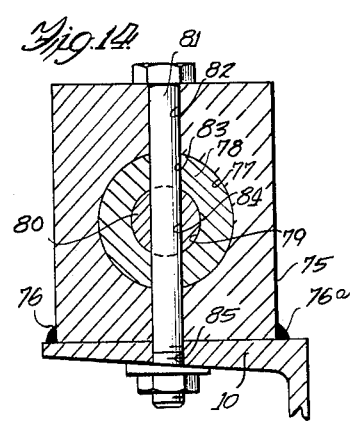

United States Patent Office 3,156,505
Patented Nov. 10, 1964

3,156,505
TRACK IDLER ADJUSTER
Clarence A. Hubert, Chicago, Ill., assignor to International Harvester Company, Chicago, Ill., a corporation of New Jersey
Filed May 22, 1962, Ser. No. 196,702
20 Claims. (Cl. 305—30)

This invention relates to a track idler adjuster and in particular relates to means for adjusting the front idler of track type tractors. More specifically this invention relates to idler mounting means that permit the idler to be raised or lowered with respect to the ground.

In tractors of the endless-track type it is common usage to employ a front idler which engages the endless track that maintains the track in a given position and determines at what point the track will engage the ground. When the tractor is traveling under normal operation or in transit and particularly in hard and rugged terrain it is preferred to have the track engage the ground when its track length is generally parallel to the ground and with a slight inclination angle to the first roller prior to contact therewith. This, of course, improves the riding qualities of the vehicle and reduces shock loads presenting a relatively smoother ride for the operator. However, when an implement such as a front-end loader or dozer is attached to the tractor it is then preferred to have a greater extent of the fore portion of the track in engagement with the ground in order to stabilize the tractor because of the over-hung weight of the loader unit and thus eliminating the upward inclination of the track as would be the case when the tractor is in transit. The employment of different size idlers and length of track would accomplish this, however, it would be necessary to provide more than one size idler and more than one size track for a given track tractor.

It is therefore a general object of this invention to provide means for adjusting the elevation of the front idler wheel of a track-type tractor with respect to the ground and therefore adjust the elevation of the front portion of the track with respect to the ground.

Another object of this invention is to provide mounting means on the track frame of a crawler tractor which will enable the raising and lowering of the front idler of the tractor and consequently raise or lower the endless track to vary the extent of track engagement with the ground and the inclination of that portion of the track that is about to have contact with the ground.

Still another object of this invention is to provide adjustable mounting means for the tractor track idlers which will permit the idler to be raised and lowered with respect to the surface of the ground in a manner that is simple and easily accomplished without the necessity of making changes in the diameter of the idler or the length of the track.

Other objects and advantages of the invention will become apparent from the following description taken in connection with the accompanying drawing. It will be understood that changes and alterations may be made in the details of construction and arrangement of parts without departing from the scope of the invention, as set forth in the accompanying claims, as the following preferred forms are given by way of illustration only.

Referring to the drawing:

FIGURE 3 is a sectional view taken along the lines 3—3 of FIGURE 2 and illustrates a section through a center portion of the front idler;

Figure 1:
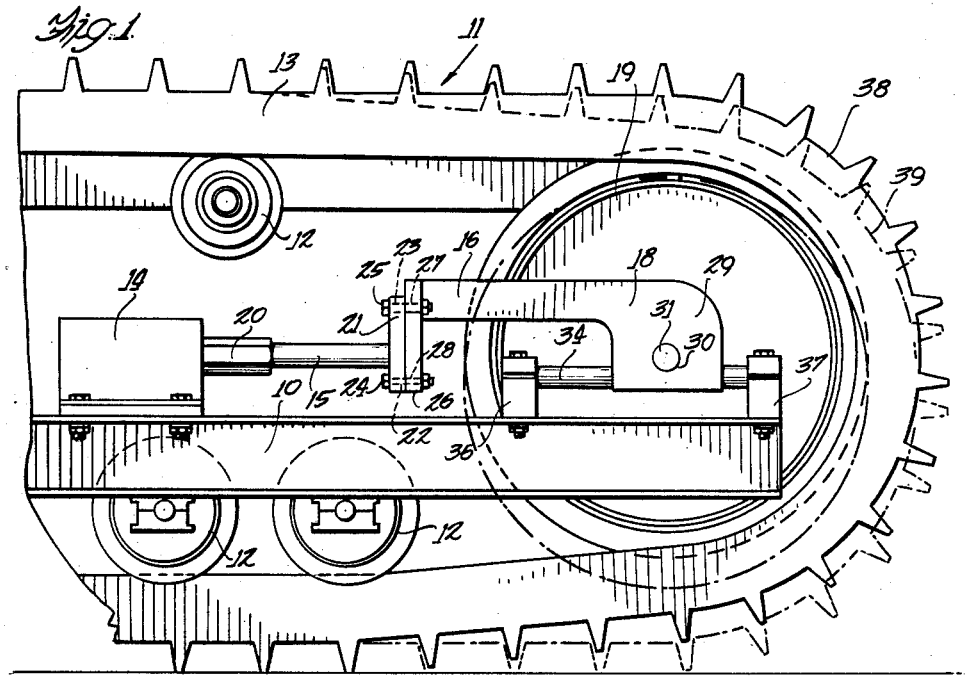
FIGURE 1 is a side elevational view of a portion of the track mechanism of the crawler tractor in which one of the front idlers is illustrated as provided with a mounting constructed in accordance with the present invention showing the front idler and associated track in a raised position.
Figure 2:
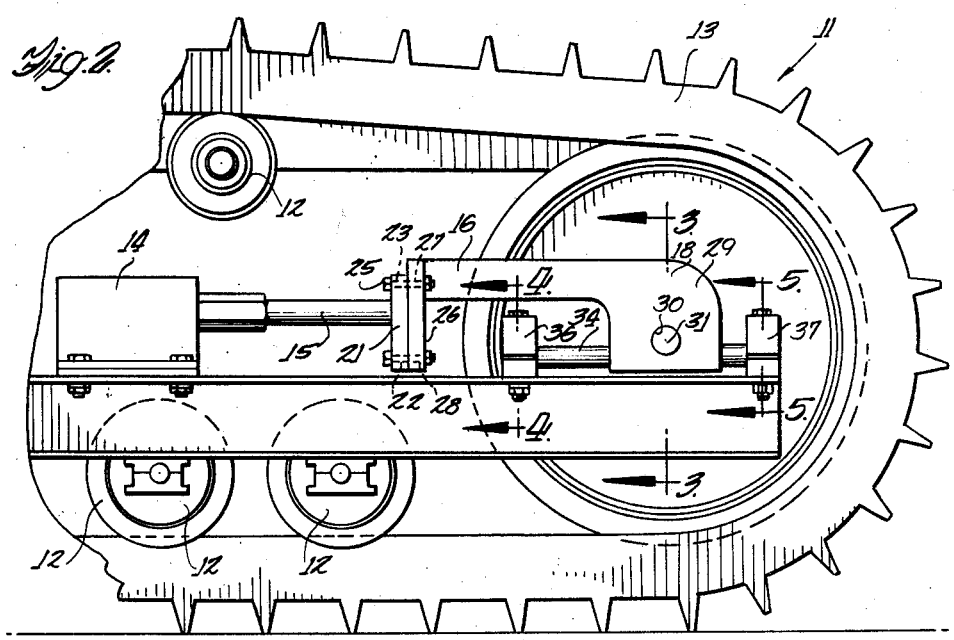
FIGURE 2 is a view similar to FIGURE 1 illustrating the front idler and associated track in a downward or lowered position.

FIGURES 4 and 5 are sectional views through respective mounting blocks of the novel idler adjustment means taken along line 4—4 and 5—5 respectively of FIGURE 2;

FIGURES 6 and 7 illustrate sectional views of the mounting blocks shown in FIGURES 4 and 5 respectively but in reversed positions;

FIGURE 8 is a view similar to FIGURES 1 and 2 and incorporates a modification of the novel mounting block means;

FIGURES 9 and 10 are sectional views of the novel mounting block means shown in FIGURE 8 and taken along lines 9—9 and 10—10 respectively of that figure;

FIGURE 11 is a side elevational view similar to FIGURE 1 and illustrates another modification of the novel mounting block means;

FIGURE 12 is a sectional view taken along line 12—12 of FIGURE 11;

FIGURE 13 is a side elevational view partly in section of the track of the front idler construction and illustrates still another modification of the novel mounting block means; and FIGURE 14 is a sectional view taken along line 14—14 of FIGURE 13.

Referring now to FIGURES 1 through 7 and in particular to FIGURE 1 there is shown the track frame 10 of the forward portion of a conventional crawler tractor 11, the track frame carrying rollers 12 over which ride the track chain 13. Supported atop the track frame 10 is an adjustable front-idler structure or recoil mechanism 14 primarily for absorbing shock loads received by the tractor and which permits shaft 15 extending therefrom to apply no or some forward thrust through arms 16 and 17 of the bifurcated idler yoke or front-idler-support unit 18 to the front-idler wheel 19 and thereby apply some and no tension load on the track 13 which engages the front idler 19 in the usual manner.

The shaft 15 of the load adjusting mechanism 14 has an adjusting nut 20 at its rear end for determining the extent of tension applied to the track 13 and at its forward end has a head or plate portion 21 provided with a pair of bores 22 and 23 forming an eccentric with respect to the axis of the shaft 15 and having bolts 24 and 25 locking plate portion 26 of each portions 16, 17 of the idler support unit 18 by engagement of the bolts 24 and 25 in complementary bores 27 and 28 of the plate portion 26. The forward end 29 of each portion 16, 17 of the idler support 18 has a bore 30 receiving the idler shaft 31 therethrough and slidably carries through bores 32 and 33 of arms 16 and 17 of the idler support unit 18, mounting rods or links 34 and 35. The mounting rod or front-idler-support rod 34 as viewed in FIGURE 1 has a rear journal with mounting block 36 and a forward journal with mounting block 37, each of these blocks or mounts 36 and 37 being bolted to the track frame 10. Since the front-idler-support unit is bifurcated, it carries a similar pair of mounting blocks and the support rod 35 therefor on the inside of the front idler 19, the mounting blocks on the inside not being shown. The other side of the tractor 11 carries a similar front-idler-mounting mechanism which is not shown. It will be noted that each of the rods 33 and 34 are keyed with shaft 31 at 30a and 30b, respectively, to prevent rotation of the latter and therefore insure rotation of the idler 19 about the shaft 31.

The invention resides in the mounting block construction which permits by the manipulation of blocks 36 and 37 the raising or lowering of the track frame as indicated in FIGURE 1 wherein the solid track lines 38 show the track 13 in a raised or transit position to provide for smooth travel of the vehicle; whereas the track outline 39 shown in dotted line illustrates the lower or loader or dozer position of the track 13 which provides a stabilizing effect at the front end of the tractor when over-hung loads are imposed at that end by a loader or dozer equipment. This raising or lowering is accomplished by reversing the blocks 36 and 37.

Reference is now directed to the construction of the mounting blocks 36 and 37 and to that end specific reference is directed to FIGURES 4, 5, 6 and 7. It will be noted that mounting block 36 has an upper block portion or element 40 and a lower block element 41 having bore portions 42 and 43 respectively receiving rod 34 therethrough and bolt means 44 and 45 extend through the block portions 40 and 41 and through the track frame 10 so as to clamp about the rod 34. The upper block element 40 is of greater vertical extent than the lower block 41. The other block unit 37 is similar to the block unit 36 having an upper block element 46 and a lower block element 47 and bolts 48 and 49 that secure the block unit 37 to the track frame 10 by having bore portions 50 and 51 clamped against the rod element 34, the upper block portion 46 being of greater vertical extent than the lower block 47. However, the bolt 48 is keyed with or passes through a portion 51a of the rod 34 to prevent rotation of the rod 34 and provides a lock for end thrust. By reversing the positions of elements 40 and 41 of the block unit 36 and elements 46 and 47 of block unit 37 upside down as shown in FIGURES 6 and 7 the rod 34 is higher with respect to the track frame and consequently the support unit 18 and the idler 19 and the track 13 are raised from lower position shown in dotted line in FIGURE 1 and in solid line in FIGURE 2 to raised or upper position shown in solid line in FIGURE 1. The recoil mechanism 14 has its shaft 15 rotated 180° so that bores 22, 23 of element 21 may properly align themselves with the bores 27, 28 of the plate 26 of the unit 18 when placed in its new or raised position.

A modification of the front-idler-adjustment design is shown in FIGURES 8, 9 and 10 and differs in the specific construction of the mounting blocks 55 and 56. The mounting block 56 is identical in construction to the mounting block 36 illustrated in FIGURES 1 through 7. However, the mounting block 55 consists of a solid member that is welded at 58 to the mounting block shaft 34 and has a pair of bores 59 and 60 receiving bolts 61 and 62 which secure the block to the horizontal portion of the track frame 10 and the bores 59 or 60 do not intersect any planes in which the rod 34 passes through as is the case with the mounting block 37 wherein its elements 46 and 47 have their bores intersecting planes in which the rod 34 is located so as to provide the afore-mentioned keying action between the bolt 48 and the shaft 34. Under this modification it will be appreciated that rotation of the rod 34 will cause rotation of the block 55 and in the position shown in FIGURE 9 it will be noted that the axis of the rod 34 is vertically below the center portion of the block 55, the block elements 62 and 63 of the block unit 56 being reversible to permit elevation and realignment of the rod 34 and consequently the idler 19 and its track 13 to the elevated or transit position.

FIGURES 11 and 12 show a further modification for vertical adjustment of the front idler employing the mounting block 55, as shown in FIGURE 9, at the forward end of the front-idler-mounting rod and welded to the rod 34 by weldment 58, whereas the rear mounting block 65 comprises a solid member having a bore 66 with its central axis below the central portion of the member 65 which is welded at 67 and 68 to the horizontal portion of the track frame 10 and carries within the bore 66 a tubular extension 69 that has a central axis above and eccentric to the central axis of the bore 66 and forms the left-end extremity of the mounting block shaft 34a which has its central axis below and eccentric to the central axis of the extension 69. After passing through the member 18, as aforementioned, the rod 34a at its forward end joins with the mounting element 55 as aforementioned. By this construction the bolts 61 and 62 are removed from the frame 10 and block 55 whereupon the block 55 along with shaft 34a which is integral therewith is removed from the block 65, rotated 180°, and then placed in the inverted position with the eccentric portion 69 once again being received in the bore 66 of secured block 65 and then the block 55 is bolted in place resulting in shifting of the idler element 18 and idler 19 from the dozer or loader (lower) position to the (raised) transit position.

The last mounting arrangement shown is illustrated by FIGURES 13 and 14 wherein there is employed a block unit 65 at the rear portion of the shaft 34b welded to frame 10 as in FIGURE 11, the shaft 34b having an extension 69 insertable into bore 66 of the element 65 in a manner shown in FIGURE 12. The forwardly disposed mounting block unit 75 is similarly welded at 76 and 76a to frame 10 in a manner similar to block element 65 and has a bore 77 receiving ring element or insert 78 having a bore 79 receiving rod extension 80 that forms the front portion of the shaft 34b and is eccentric to the shaft 34b in a manner like extension 69 at the rear end of said shaft. A bolt or pin member 81 passes through bore 82 in the solitary or unity block member 75 and passes through the bore 77 and through the slot 83 in the ring element 78 and through the bore 84 in the rod extension 80 and through the bore 85 in the horizontal portion of the track frame 10. Should it be desired to go from the lower to the upper position of the front idler or vice versa, the pin 81 is removed from the block 75 and the rod 34b is rotated 180° placing the extension 69 and 80 in a downward position and elevating the central portion of the rod 34b and consequently the idler arm 18 and the idler 19 and the track 13. The ring or insert 78 permits the assembly and disassembly of the shaft or rod 34b into each of the mounting blocks 65 and 75. Consequently it can be seen that vertical movement is obtained by rotating the shaft 34b 180° in journals eccentric to the center line of shaft 34b and the insert 78 in the front block 75 permits assembly and disassembly of the shaft. The bolt 81 not only locates the shaft but also locks the shaft and insert 78 in place.

I claim:

1. In an endless track having idler wheels over which the track passes, means supporting the idler wheels including a track frame, idler wheel shafts rotatively supporting the wheels, idler support rods extending transverse to the shafts for carrying the wheels, blocks bored for the reception and support of said rods, said blocks having a fixed connection with the track frame on opposite sides of each of the shafts, the bores in the blocks being displaced vertically from center, and means to enable inverting of said blocks to alter the elevation of the idler wheels.

2. In an endless track having a track frame and an idler wheel over which the track passes, an idler wheel shaft rotatively supporting the wheel, idler support means transverse to and carrying the idler wheel shaft, said means including a pair of mounts fixedly connected with the track frame on opposite sides of the shaft, and link means operatively connected with the idler wheel shaft, said link means being connected between the mounts and displaced vertically from the center of each mount in a first position, said mounts being provided with means for displacing the link means into a second position vertically displaced from the center of each mount.

3. In a tractor with an endless track having a track frame and an idler wheel over which the track passes, an idler wheel shaft rotatably supporting the wheel, idler support means carrying the idler wheel shaft and including a pair of mounts fixedly connected with the track frame on opposite sides of the shaft, and link means transverse to and connected with the idler wheel shaft and the mounts, and being displaced below a central plane of the mounts in a first position, said mounts being provided with means to enable the link means to be displaced above the central plane of the mounts in a second position.

4. In a tractor with an endless track having a track frame and an idler wheel for the track, a wheel shaft rotatably supporting the wheel, an idler wheel recoil assembly on the track frame including idler wheel support mounts on opposite sides of the shaft and attached to the track frame, and link means connecting the shaft and the mounts to support the idler wheel, said assembly having a member slidingly mounted on the link means, at least one of the mounts having an eccentriaclly positioned bore to receive the link means whereby the elevation of the idler wheel is changed by relocation of the bore with respect to the track frame.

5. In a tractor with an endless track having a track frame and an idler wheel for the track, a wheel shaft rotatively supporting the wheel, an idler wheel recoil assembly on the track frame, idler wheel support mounts on opposite sides of the shaft and fixedly mounted on the track frame, said wheel support mounts having link means transverse to the shaft for supporting the idler wheel, said link means being supported by the wheel support mounts and having means slidably connecting the link means and each one of the respective shaft and assembly, said mounts having eccentrically positioned bores to receive the link means whereby the elevation of the idler wheel is changed by relocation of the link means with respect to the track frame.

6. In a tractor with endless tracks having track frames and idler wheels supported by the track frames, a wheel shaft rotatively supporting each of the wheels, idler wheel mounting blocks on opposite sides of each shaft and mounted on the track frames and having bores, and idler support rods transverse to each shaft and receivable in the bores, said idler wheels and shafts being slidably connected to and carried by the idler support rods, said bores being differentially spaced with relation to the top and bottom surfaces of the blocks whereby the elevation of the idler wheels may be altered by inverting the blocks.

7. In a tractor with endless tracks having track frames and an idler wheel for each track, a wheel shaft rotatively supporting each wheel, idler recoil assemblies on the track frames, idler wheel support rod blocks on opposite sides of each shaft and being reversibly supported by and rigidly mounted on the track frames, said blocks having support rods transverse to the shafts and slidably connected to the assemblies to support each idler wheel, said blocks having eccentrically positioned bores to receive the rods whereby elevation of the idler wheels is changed by reversal of the blocks.

8. In an endless track means having a track, a track frame, and a front idler wheel over which the track passes, means slidably supporting the idler wheel including a shaft rotatively supporting the wheel, idler support rods transverse to the shaft, said shaft being slidably supported by the idler support rods, blocks fixedly mounted on the track frame on opposite sides of the shaft each having a bore for the reception and support of said rods, the bores in said blocks being displaced vertically from center, and means to enable inverting of said blocks to alter the elevation of the idler wheel.

9. In an endless track having a front idler wheel over which the track passes, means supporting the idler wheel including a shaft rotatively supporting the wheel and support rods transverse to the shaft, blocks on opposite sides of the shaft each having a bore for the reception and support of the rods, the bores in said blocks being displaced vertically from center, said rods including extension means having a central axis eccentric to the central axis of said rods to enable rotation of the rods to alter the elevation of the idler wheel.

10. In an endless track having a front idler wheel over which the track passes, means supporting the idler wheel including a shaft rotatively supporting the wheel and a support rod transverse to the shaft, blocks on opposite sides of the shaft each having a bore for the reception and support of the rod, the bores in said blocks being displaced vertically from center, said rod including extension means having a central axis eccentric to the central axis of said rod to enable rotation of the rod to alter the elevation of the idler wheel, and insert means received in one of the bores having a bored receptacle supportingly receiving one of the extensions, said insert means being rotatively received as aforesaid, thereby being relatively rotatable with respect to said one of the bores of the blocks.

11. In an endless track having a front idler wheel over which the track passes, means supporting the idler wheel including a shaft rotatively supporting the wheel and support rods transverse to the shaft, blocks on opposite sides of the shaft each having a bore for the reception and support of the rods, the bores in said blocks being displaced vertically from center, said rods including extension means having a central axis eccentric to the central axis of said rods to enable rotation of the rods to alter the elevation of the idler wheel, insert means received in one of the bores having a bore receptacle supportingly receiving one of the extensions, said insert means being rotatably received as aforesaid, thereby being relatively rotatable with respect to said one of the bores of the blocks, said track being entrained about a frame, and means for holding the blocks to the frame and preventing relative movement thereof during rotation of the insert.

12. In an endless track means having a track and a track frame and front idler wheel means over which the track passes, means slidingly supporting the idler wheel means including a shaft rotatively supporting the wheel means and idler support rods transverse to the shaft and blocks on opposite sides of the shaft each having a bore for the reception and support of said rods, said blocks being fixedly attached on the track frame, the bores in the blocks being displaced vertically from center and means to enable inverting of said blocks to alter the elevation of the idler wheel, each of said blocks comprising a first block segment of one vertical extent having a semi-circular slot therein and a second block segment of another vertical extent having a semi-circular slot therein, each of the segments being arranged together to have their respective slots define the bore of the block, the means to enable inverting of the blocks including a releasable clamp structure holding the block segments together with their semi-circular slot encompassing the support rod, said clamp structure comprising a bolt means passing through each block segment and a portion of one bolt keying the one against movement relative to the segments.

13. In an endless track means having a track and a track frame and a front idler wheel over which the track passes, means slidingly supporting the idler wheel including a shaft rotatively supporting the wheel and a support rod transverse to the shaft, a first reversible block unit on one side of the shaft having an off-center bore for reception of a portion of the rod and second block unit on the other side of the shaft comprising a pair of reversible segments of different vertical extent, said block units being fixedly attached on the track frame each segment having a common diameter semi-circular slot registrable with one another and defining another off-center bore receiving another portion of the rod, and releasable clamp means mounting the rod within the bores of the blocks in immobile horizontal position in first and second vertical positions with attendant vertical displacement of the idler.

14. In an endless track having a front idler wheel over which the track passes, means supporting the idler wheel including a shaft rotatively supporting the wheel and a support rod transverse to the shaft, a pair of mounts on opposite sides of the shaft carrying the rod, each mount being provided with an off-center bore with respect to the top and bottom of the mount, each bore receiving an end portion of the rod for holding same in generally horizontal alignment, one of said bores having a dimension less than the other and having an axis eccentric to the other, said rod having an end portion of reduced external dimension eccentric to the central axis of the remaining portion of the rod, said end portion being received into the bore of less dimension and providing a pivotal axis for rotating the rod in one of the mounts from a lower idler position to a raised idler position.

15. In a tractive vehicle of the crawler type having a track frame and an endless track and an idler over which the track passes and a shaft rotatively supporting the idler and an idler recoil mechanism on the track frame for absorbing shock loads to the idler, idler support means carrying the idler and including a pair of mounts on opposite sides of the shaft on the track frame and link means transverse to the shaft and connected between the mounts and displaced vertically from the center of each mount in a first position and the mounts being provided with means for displacing the link means to a second position vertically from the center of each block, means connecting the recoil mechanism with the link means and being provided with an offset interlock therebetween in both positions.

16. The invention according to claim 9, said means supporting the idler wheel including a track frame, said one of said blocks receiving said extension means being fixedly anchored to said track frame and another block receiving said one support rod being fixedly anchored to said one support rod.

17. In an endless track having a track frame and a front idler wheel means over which the track passes, means slidingly supporting the idler wheel means including a shaft rotatively supporting the wheel means and an idler support rod transverse to the shaft and blocks rigidly mounted on the track frame on opposite sides of the shaft each having a bore for the reception and support of said rod, the bores in the blocks being displaced vertically from center and means to enable inverting of said blocks to alter the elevation of the idler wheel, at least one of said blocks comprising a first reversible block segment of one vertical extent having a semi-circular slot therein and a second reversible block segment of another vertical extent having a semi-circular slot therein, each of the segments being arranged together to have their respective slots define the bore of the block, the means to enable inverting of the segments forming the blocks including a releasable clamp structure holding the block segments rigidly together on the track frame with their semi-circular slot encompassing the support rod.

18. In an endless track means having a track frame and a front idler wheel means over which the track passes, means supporting the idler wheel means including a shaft rotatively supporting the wheel means and an idler support rod and blocks rigidly mounted on the track frame on opposite sides of the shaft each having a bore for the reception and support of said rod transverse to the shaft, the bores in the blocks being displaced vertically from center and means to enable inverting of said blocks to alter the elevation of the idler wheel, each of said blocks comprising a first reversible block segment of one vertical extent having a semi-circular slot therein and a second reversible block segment of another vertical extent having a semi-circular slot therein, each of the segments being arranged together to have their respective slots define the bore of the block, the means to enable inverting of the segments forming the blocks including a releasable clamp structure holding the block segments together with their semi-circular slot encompassing the support rod.

19. The invention according to claim 10, the means supporting the idler wheel including track frame means, said blocks being fixedly anchored to said track frame means.

20. In endless track means having a track, a track frame, and front idler wheel means over which the track passes, means slidingly supporting the idler wheel means including a shaft rotatively supporting the wheel means, an idler support rod transverse to the shaft, blocks on opposite sides of the shaft each having a bore for the reception and support of said rod, said blocks being fixedly mounted on the track frame, the bores in the blocks being displaced vertically from center, and means to enable inverting of said blocks to alter the elevation of the idler wheel means, each of said blocks comprising a first block segment of one vertical extent having a semi-circular slot therein, and a second block segment of another vertical extent having a semi-circular slot therein, each of the segments being arranged together to have their respective slots define the bore of the block, the means to enable inverting of the blocks including a releasable clamp structure holding the block segments together with their semi-circular slot encompassing the idler support rod.

References Cited in the file of this patent

UNITED STATES PATENTS

| | | |
|---|---|---|
| 2,511,098 | Bridwell et al. | June 13, 1950 |
| 2,926,969 | Ashley | Mar. 1, 1960 |